US012688219B2

(12) United States Patent
Faonte et al.

(10) Patent No.: US 12,688,219 B2
(45) Date of Patent: Jul. 21, 2026

(54) ENHANCED SEARCH FOR INFORMATION DISCOVERY

(71) Applicant: Goldman Sachs & Co. LLC, New York, NY (US)

(72) Inventors: Giovanni Faonte, Jersey City, NJ (US); Shreya Chandrashekar Srinarasi, Jersey City, NJ (US); Christopher M. Churchman, New York, NY (US); Laurent Charles Storoni, Luxembourg (LU); Cheska Adrianne Mauban, Queens, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/929,460

(22) Filed: Oct. 28, 2024

(65) Prior Publication Data

US 2025/0139145 A1 May 1, 2025

Related U.S. Application Data

(60) Provisional application No. 63/593,509, filed on Oct. 26, 2023.

(51) Int. Cl.
*G06F 16/338* (2019.01)
*G06F 16/334* (2025.01)

(52) U.S. Cl.
CPC ........ *G06F 16/338* (2019.01); *G06F 16/3344* (2019.01)

(58) Field of Classification Search
CPC .................................................... G06F 16/338
See application file for complete search history.

(56) References Cited

U.S. PATENT DOCUMENTS

| | | | |
|---|---|---|---|
| 2009/0319517 A1* | 12/2009 | Guha ..................... | G06F 16/951 |
| | | | 707/999.005 |
| 2021/0248167 A1* | 8/2021 | Nadler ..................... | G06F 16/26 |
| 2025/0077549 A1* | 3/2025 | George ................. | G06F 16/287 |
| 2025/0285012 A1* | 9/2025 | Blair ....................... | G06N 20/00 |

\* cited by examiner

*Primary Examiner* — Van H Oberly
(74) *Attorney, Agent, or Firm* — Fenwick & West LLP

(57) ABSTRACT

A hybrid architecture that combines the efficiency of small language models with the accuracy of large language models for enhanced selection of requested functionality and identification of data visualizations using an enterprise system is described. For instance, a widget selection method employs a hybrid architecture using both small and large language model to efficiently search through possible widgets by using an LLM to vectorize the titles widgets and information associated with those widgets and a small language model to use a natural language model to search the vectorized widgets.

20 Claims, 9 Drawing Sheets

ENHANCED SEARCH FOR INFORMATION DISCOVERY

CROSS REFERENCE TO RELATED APPLICATIONS

This application which claims priority to U.S. Provisional Application No. 63/593,509, filed on Oct. 26, 2023.

BACKGROUND

Field of Disclosure

The present invention relates generally to the field of natural language processing and machine learning. More specifically, this invention relates to hybrid language model architecture for orchestrating the generation and transmission of payloads for widget searches within a system environment.

Description of the Related Art

Natural language processing (NLP) and machine learning technologies have shown significant advancements in recent years, allowing computers to understand and generate human language more efficiently and accurately. Language models play a crucial role in various NLP tasks, such as machine translation, summarization, sentiment analysis, and API orchestration.

Discussed herein are two general categories of language models: small language models and large language models. Small language models have fewer parameters, making them easier to train but often lacking the capacity to learn and generalize complex patterns in natural languages. As a result, small language models are not suitable for many challenging applications. Large language models, on the other hand, have a greater number of parameters, which allow them to generate highly accurate text and demonstrate impressive language-understanding capabilities. However, training large language models often requires intensive computational resources, power consumption, and time, making it difficult for many researchers and organizations to utilize their full potential.

To address these challenges, it is desirable to develop a system that combines the efficiency of small language models with the accuracy of large language models in a single architecture specifically designed for API orchestration systems. By implementing a hybrid architecture, such systems can achieve a balance between computational cost and performance, enabling more efficient workflows that employ the APIs.

SUMMARY

In some aspects, the systems and methods described herein relate to a method for generating a payload response for a requested functionality and a data visualization for the requested functionality in a system environment, the method including: receiving, at a network system from a client device, a request including a natural language request for the data visualization of the requested functionality; determining, at the network system, a set of selected data visualizations, each of the selected data visualizations configured for displaying information about the requested functionality, the determination including: generating a query vector representing the natural language request using a small language model; comparing the query vector to each of a plurality of stored enhanced vectors, each stored enhanced vector corresponding to a data visualization of a plurality of data visualizations, and the plurality of stored enhanced vectors generated by applying a large language model to at least a title for each of the plurality of data visualizations; and selecting one or more of the plurality of data visualizations as the set of selected data visualizations based on the comparison; and providing, from the network system to the client device, the set of selected data visualizations to the client device.

In some aspects, the systems and methods described herein relate to a method, wherein selecting the set of selected data visualization based on the comparison includes calculating a similarity between the query vector and each of the plurality of stored enhanced vectors corresponding to data visualizations.

In some aspects, the systems and methods described herein relate to a method, wherein the set of selected data visualizations includes a number of data visualizations having a calculated similarity above a threshold.

In some aspects, the systems and methods described herein relate to a method, wherein the set of selected data visualizations includes a predetermined number of data visualizations.

In some aspects, the systems and methods described herein relate to a method, further including: applying a model to each of the plurality of data visualizations to determine additional information describing the plurality of data visualizations; and generating a stored enhanced vector representing the additional information for each of the plurality of data visualizations.

In some aspects, the systems and methods described herein relate to a method, wherein the model is a large language model and the additional information is information associated with content, context, and intent of a title of the data visualization.

In some aspects, the systems and methods described herein relate to a method, wherein the additional information includes one or more of people, events, metrics, or entities associated with a title of the data visualization.

In some aspects, the systems and methods described herein relate to a method, further including: requesting, from one or more additional client devices, data for generating a data corpus, the data corpus including information with the plurality of data visualizations are configured to visualize.

In some aspects, the systems and methods described herein relate to a method, further including: receiving, from one or more additional client devices, one or more data visualizations for the plurality of data visualizations.

In some aspects, the systems and methods described herein relate to a method, further including: selecting one or more datastores from a plurality of datastores, the selection based on a comparison of visualizations stored in each of the plurality of datastores to the requested functionality of the natural language request; and selecting the plurality of data visualizations from the selected one or more datastores.

In some aspects, the systems and methods described herein relate to a non-transitory computer-readable storage medium including computer program instructions for generating a payload response for a requested functionality and a data visualization for the requested functionality in a system environment, the computer program instructions, when executed by one or more processors, causing the one or more processors to: receive, at a network system from a client device, a request including a natural language request for the data visualization of the requested functionality; determine, at the network system, a set of selected data visualizations, each of the selected data visualizations configured for displaying information about the requested functionality, the determination including: generating a query vector representing the natural language request using a small language model; comparing the query vector to each of a plurality of stored enhanced vectors, each stored enhanced vector corresponding to a data visualization of a plurality of data visualizations, and the plurality of stored enhanced vectors generated by applying a large language model to at least a title for each of the plurality of data visualizations; and selecting one or more of the plurality of data visualizations as the set of selected data visualizations based on the comparison; and provide, from the network system to the client device, the set of data visualizations to the client device.

In some aspects, the systems and methods described herein relate to a non-transitory computer-readable storage medium, wherein selecting the set of selected data visualization based on the comparison causes the one or more processors to: calculate a similarity between the query vector and each of the plurality of stored enhanced vectors corresponding to data visualizations.

In some aspects, the systems and methods described herein relate to a non-transitory computer-readable storage medium, wherein the set of selected data visualizations includes a number of data visualizations having a calculated similarity above a threshold.

In some aspects, the systems and methods described herein relate to a non-transitory computer-readable storage medium, wherein the set of selected data visualizations includes a predetermined number of data visualizations.

In some aspects, the systems and methods described herein relate to a non-transitory computer-readable storage medium, wherein the computer program instructions, when executed by the one or more processors, cause the one or more processors to: apply a model to each of the plurality of data visualizations to determine additional information describing the plurality of data visualizations; and generate a stored enhanced vector representing the additional information for each of the plurality of data visualizations.

In some aspects, the systems and methods described herein relate to a non-transitory computer-readable storage medium, wherein the model is a large language model and the additional information is information associated with content, context, and intent of a title of the data visualization.

In some aspects, the systems and methods described herein relate to a non-transitory computer-readable storage medium, wherein the additional information includes one or more of people, events, metrics, or entities associated with a title of the data visualization.

In some aspects, the systems and methods described herein relate to a non-transitory computer-readable storage medium, wherein the computer program instructions, when executed by the one or more processors, cause the one or more processors to: request, from one or more additional client devices, data for generating a data corpus, the data corpus including information with the plurality of data visualizations are configured to visualize.

In some aspects, the systems and methods described herein relate to a non-transitory computer-readable storage medium, wherein the computer program instructions, when executed by the one or more processors, cause the one or more processors to: receive, from one or more additional client devices, one or more data visualizations for the plurality of data visualizations.

In some aspects, the systems and methods described herein relate to a non-transitory computer-readable storage medium, wherein the computer program instructions, when executed by the one or more processors, cause the one or more processors to: select one or more datastores from a plurality of datastores, the selection based on a comparison of visualizations stored in each of the plurality of datastores to the functionality requested in the natural language request; and select the set of visualization from the selected one or more datastores.

Figure 1:
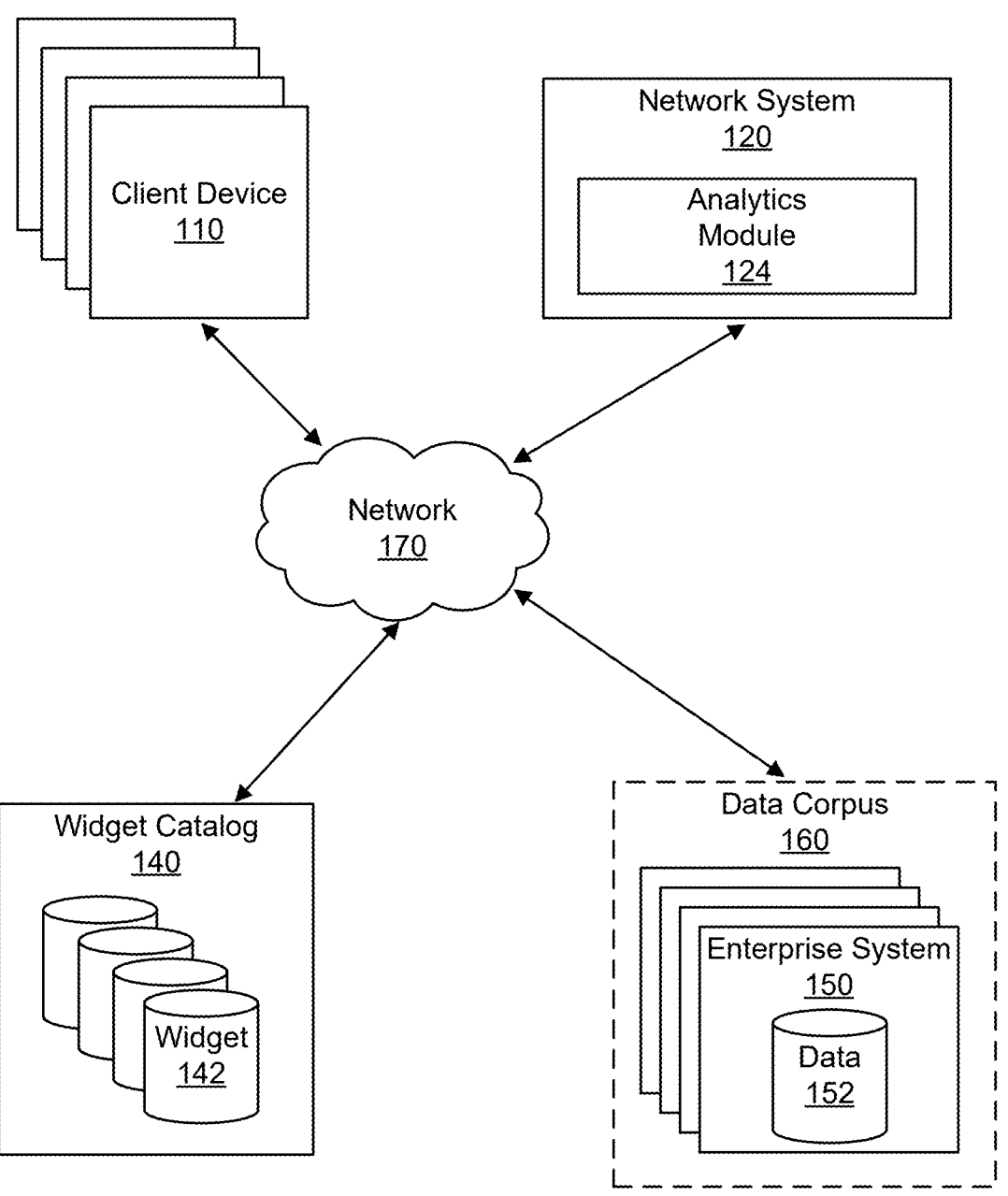
FIG. 1 illustrates a system environment configured for enabling client devices to efficiently identify, interpret, and manage data on a network system using hybrid model approaches, according to an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

An improved hybrid language model architecture for a system environment in which widget searching occurs is disclosed.

The disclosed system and methods combine the benefits of both small and large language models. For instance, the architecture addresses the drawbacks of small language models that have limited capacity to learn and generalize complex patterns in natural languages and large language models that require significant computational resources and time for training. The hybrid architecture is particularly advantageous in various natural language processing tasks such as (1) determining a payload from a natural language payload request, generating the payload, and delivering the payload, and (2) vectorizing information describing a large number of data functions and visualizations, processing a natural language request for a data function and visualization, and using the vectorized information and processed natural language request to select the appropriate data visualization (or API).

To establish a foundation for this approach, the description turns to a brief description of the problem at hand. In recent years, language modeling has gained significant traction within the field of artificial intelligence and natural language processing. Language models play a key role in tasks such as machine translation, summarization, and sentiment analysis. There are generally two types of language models: small language models and large language models. Small language models have fewer parameters and are relatively easier to train, while large language models utilize a greater number of parameters and demonstrate an ability to generate more accurate and coherent text in various applications (while being much harder and expensive to train).

Small language models tend to be insufficient in various contexts, primarily due to their limited capacity to learn and generalize complex patterns and relationships present in natural languages. These models often fall short when tasked with challenging applications such as long-form text generation or deep semantic understanding. As a result, their usefulness is constrained, and they are less desirable for comprehensive language understanding.

On the other hand, large language models, in many ways, address the limitations posed by small language models. They can generate highly accurate text and demonstrate impressive language-understanding capabilities. However, training large language models comes at a significant cost in terms of computational resources, power consumption, and time requirements. This barrier often prevents many research teams and organizations from harnessing the full potential these models offer.

One possible solution to address this challenge is to develop systems that utilize both small and large language models in a synergistic manner. By implementing a hybrid architecture that combines the efficiency of small language models with the accuracy of large language models, such systems can achieve a balance between computational cost and performance. This tandem approach opens new possibilities for improved language understanding and enables more efficient deployment of language models across various tasks and applications.

Additionally, an efficient deployment of a hybrid system allows for scaling across enterprise systems that would be unachievable for either of the models independently. To illustrate, a large language model is very accurate but suffers from limitations on input length (e.g., token), and therefore has trouble scaling when the input information is too large (e.g., all possible widgets in a catalog). On the other, a small language model (e.g., an embedder) allows the system to select a set of candidates but does not offer the same level of precision/accuracy in selecting information based on an input as does the LLM. By combining the two models in a hybrid approach, a system may scale by first using an embedder to reduce the number of possible options for selection and inputting the reduced options into a large language model for a refined selection. The converse example is also possible. That is, a large language model can be used to create vectors describing a multitude of data objects (e.g., widgets). Those LLM-generated vectors may then be searched using a small language model (e.g., an embedder) to determine which of the data objects are most appropriate. In both examples, the synergy of a large language model and small language model allows for scalable enterprise solutions.

The description herein provides particular examples of a hybrid architecture that enables such synergies. For instance, the widget selection methods below employ a hybrid architecture using both a small and a large language model to efficiently search through possible widgets in a way that also utilizes the benefits of both models.

II. System Environment

FIG. 1 illustrates a system environment configured for enabling client devices to efficiently identify, interpret, and manage data on a network system using hybrid model approaches, according to an example embodiment. In the illustrated example, the system environment includes a client device 110, a network system 120, a widget catalog 140 including widgets 142, an enterprise system 150 including data 152 which forms a data corpus 160, and a network 170. The network system 120 includes an analytics module 124. The system environment 100 may include one or more client devices 110 (e.g., 1, 2, 3, 5, . . . , N client devices) and/or may include one or more enterprise system 150 (e.g., 1, 2, 3, 5, . . . , N enterprise systems). Some embodiments of system environment 100 have different systems and modules than those described herein. Similarly, functions of the systems and modules can be distributed within the system environment 100 in a different manner than is described herein.

Within the system environment 100, the network system 120 generates a payload response in response to receiving a payload request from a client device 110. A payload request is a request for information that is accessible, derivable, visualizable, etc. (e.g., widgets) within the system environment 100. Usually, a payload request is a natural language input from a user using the client device 110A, and payload response is a response generated by the network system 120 that provides that information. In various configurations, the payload response may be, e.g., directly providing the requested information, providing a widget 142 to aid in deriving and visualizing the information. In some instances, rather than providing the widget 142 directly, the network system 120 may execute the widget 142 locally and provide the generated visualizations and/or a result of the executed widget 142. Moreover, the network system 120 may also provide a user interface for some (or all) users to create new widgets within the system environment 100.

In an example, the payload request may describe a request for, e.g., contract information within the system. To that end, the payload request may be, e.g., "What were Metrics A at Entity B at Event C for Data Corpus D yesterday?" Given this payload request, the payload response may be an API 132 that calculates the requested daily volumes, and/or an API 132 that enables the requesting client device 110 to access the appropriate databases and derive any requested information. As an express example to the query above, the payload response may be, e.g., a data structure resulting from resulting from execution of an API 132 including the information "Asset: Title 1 for Entity 1, Volume: Metric 1; Asset: Title 2 for Entity 2, Volume: Metric 2," etc.

The client device 110 can be any computing device configured to interact with the analytics module 124. Although FIG. 1 shows several client devices 110, the system environment 100 may include any number of such devices. The client devices 110 present one or more user interfaces via which users may search for widgets 142 and/or APIs 132. Various embodiments of the client devices 110 and user interfaces are described in greater detail below, with reference to FIG. 2.

The network system 120 may utilize the analytics module 124 to generate a payload response that includes a widget 142 and/or a visualization generated by an executed widget 142. At a high level, a payload response that includes a widget receives a natural language search query from a client device 110, processes the natural language query into an embedding, and compares the embedding to enhanced search vectors representing various widgets. Details of the analytics module 124 and the corresponding process are provided below in regard to FIG. 3 below.

A widget catalog 140 stores a catalog of widgets 142. Each widget 142, in general, may perform some function that enables the network system 120 to respond to payload requests. For example, the widget may access data from a first system and a second system, analyze or compare data from two systems, apply models to the data, and generate a visualization representing that data etc. Additionally, each widget 142 is usually associated with information (e.g., name, title, size, metadata) that describes its functionality. For example, the metadata for a widget 142 may describe the functionality, location, applied models, information stores it accesses, names, dates, sizes, speeds, contracts, etc. of the widget 142.

An enterprise system 150 is one or more systems or databases connected to the network system 120 within the system environment 100 that include data 152 for responding to payload requests. The data 152 in the enterprise system(s) 150 may include APIs 132 for the API catalog 130, widgets 142 for the widget catalog 140, information accessible by an API 132 or widget 142, functionality for deriving information, etc. More broadly, an enterprise system 150 may include information necessary to generate a payload response for a payload request generated by a client device 110, in whatever format may be applicable.

In aggregate, information from data 152 in the enterprise system(s) 150 form a data corpus 160. The data corpus 160 includes underlying data that is visualized within the widgets 142, retrievable via APIs 132, executable via APIs 132 and widgets 142, etc., that may be included in a payload response. Although the data corpus 160 is shown as a distinct entity, the data corpus may be part of the network system 120.

Data in the data corpus 160 can describe a multitude of topics. In one embodiment, the data comprises data structures describing financial data (e.g., asset prices) but the disclosed techniques can be applied to any corpus of data for which visualizations are provided via widgets 142 may act on. In the case of financial data, the data corpus 160 may include information about each transaction made on one or more exchanges involving one or more assets that are tracked by the analytics module 124. The information for a transaction may include the asset or assets traded, the price, a timestamp indicating when the transaction occurred, and derived data, such as volatility surfaces and discount curves. The information for the transaction may include additional data, such as an identifier of the buyer, an identifier of the seller, an identifier of the trading platform or exchange through which the transaction occurred, etc. The data corpus 160 may receive market data (e.g., from computing systems of the exchanges or trading platforms) in periodic batches (e.g., once an hour or once a day). Additionally or alternatively, market data may be received in one or more continuous or semi-continuous data streams, or on demand, etc.

As shown in FIG. 1, client device 110, network system 120, API catalog 130 widget catalog 140, and enterprise system 150 are in communication with one another via a network(s) 170. In one embodiment, the network 170 is the Internet or any combination of a LAN, a MAN, a WAN, a mobile, wired or wireless network, a private network, or a virtual private network. While only a client device 110 and a single catalog 130 are shown in FIG. 1, any number of client devices 110 and catalogs 130 can be in communication with orchestration module 122 via the network 170.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Client Device

Figure 2:
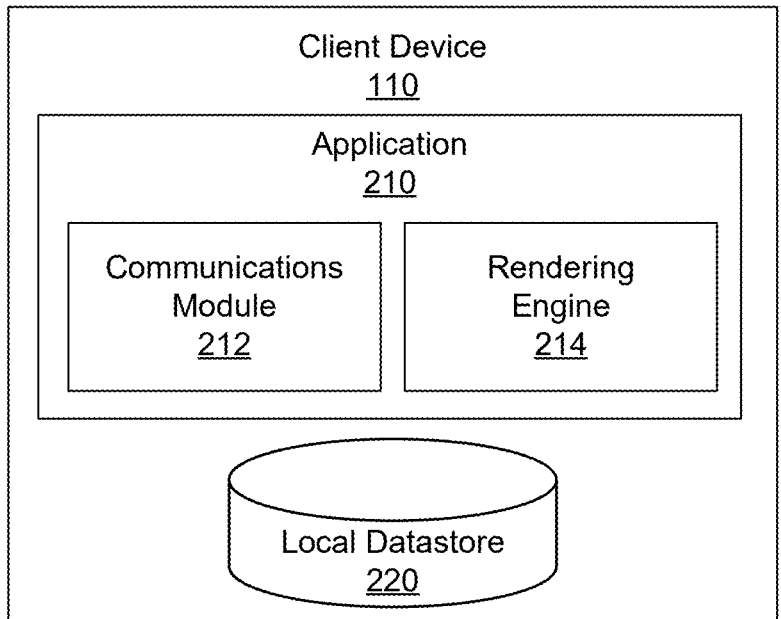
FIG. 2 illustrates one embodiment of a client device that may be used to interact with the network system, according to an example embodiment.

FIG. 2 illustrates one embodiment of a client device 110 that may be used to interact with the network system 120. In the illustrated example, the client device 110 includes an app 210 and a local datastores 220. In other embodiments, the client device 110 includes different or additional elements. In addition, the functions may be distributed among the elements in a different manner than described.

The application 210 is software that executes on the client device 110 to enable interaction with the analytics module 124. The application 210 may include a communications module 212 and a rendering engine 214. The communications module 212 sends requests for widgets 142 and/or APIs 132 (e.g., a payload request) to the network system 120 over the network 170 and receives/processes search results and data for providing selected widgets 142 and/or APIs 132 (e.g., a payload response). The rendering engine 214 causes the client device 110 to display various visualizations provided by the widgets 142 and or APIs 132. The rendering engine 214 may interact with or be executed by one or more graphics processing units (GPUs) to generate the visualizations. The local datastore 220 includes one or more computer-readable media that store the data used by the client device 110. For example, the local datastore 220 may include cached copies of data used by the widgets 142 and or APIs 132.

Analytics Module

Figure 3:
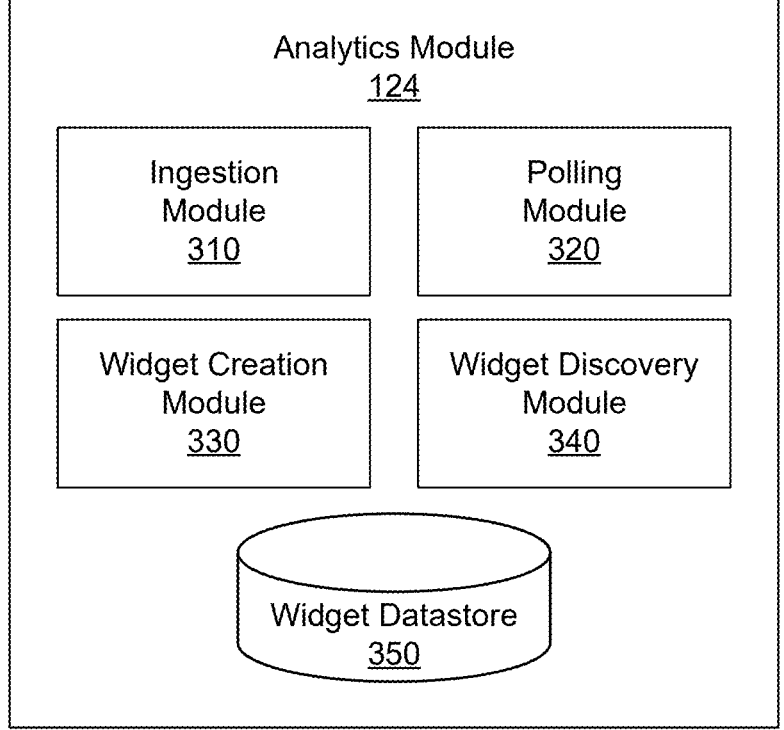
FIG. 3 illustrates an embodiment of the analytics module, according to an example embodiment.

As described above, the analytics module 124 also receives payload requests from a client device 110 via the network 170, and sends payload responses to the client device 110 via the network 170. FIG. 3 illustrates an embodiment of the analytics module, according to an example embodiment. In the embodiment shown, the analytics module 124 includes an ingestion module 310, a polling module 320, a widget creation module 330, a widget discovery module 340, and a widget datastore 350. In other embodiments, the analytics module 124 includes different or additional elements. In addition, the functions may be distributed among the elements in a different manner than described, and/or the functions may be distributed within the system environment 100 in a different manner than described.

The ingestion module 310 obtains data regarding one or more domains (e.g., from the data corpus 160). Domains, at a high level, represent one or more contextually, semantically, intentionally, etc. distinguishable subsets of data within the data corpus 160. When generating the data corpus, the network system 120 may input data from various sources and appropriately classify it into a domain using, e.g., a language model (e.g., small or large).

To illustrate, in the case of market data, the ingestion module 310 may obtain raw price data for assets, metrics calculated from the raw price data (e.g., maximum, minimum, opening, and closing prices), or both present in the data corpus 160. In cases where raw price data is obtained, the ingestion module 310 may calculate some or all of the metrics. Furthermore, the ingestion module 310 may create additional secondary metrics using metrics obtained from external sources. For example, if the ingestion module 310 retrieves daily mean prices from a market data datastore, the ingestion module may calculate weekly and monthly mean prices from the daily mean prices. The ingestion module 310 may store a local copy of the obtained data and any calculated metrics. In some cases, the ingestion module 310 may create data structures to store the data in formats usable by the analytics module 124.

The polling module 320 generates user interfaces. The user may access the user interface using a client device 110. As an example, the user interface may overlay historical price data for an asset with a price prediction distribution. In various embodiments, the polling module 320 periodically receives predictions for the price of one or more assets in an upcoming time period. For example, the polling module 320 may identify a set of client devices 110 belonging to users designated to provide predictions of the price of one or more assets of interest (e.g., users that act as "predictors" operating a "predictor set" of client devices). The same predictors may be prompted to provide predictions for all of the assets of interest or different predictors may be prompted for different assets. The predictors may be incentivized to provide predictions using gamification techniques, such as providing a leaderboard of users who provided the most accurate predictions for a previous time period or previous time periods (e.g., with more recent time periods being weighted more heavily than time periods that are further in the past). Furthermore, in some embodiments, the contribution of predictions provided by predictors to the price prediction distribution may be weighted based on the accuracy of their prior predictions.

In one embodiment, the polling module 320 sends a request to the predictor set that causes the client devices 110 to prompt the predictors to provide a prediction of the price of one or more of the assets of interest for the upcoming time period. A predictor may use various user interfaces (e.g., provided by the polling module 320) and approaches to enter predictions. In one embodiment, the predictors are prompted within an application 210 running on the client device 110 to submit their predictions and provided with a corresponding interface for entering the predictions. For example, a predictor may input price estimates for a set of assets by positioning a corresponding set of sliders in a window or typing them into a form. Alternatively, the polling module 320 may send the request through other channels, such as via email or instant messenger. The predictors may be shown a chart illustrating the price of the asset in preceding time periods (e.g., a candlestick chart indicating the daily or weekly minimum, maximum, opening, and closing prices of the asset for the last week, month, six months, or year, etc.) to aid in estimating the price for the upcoming time period. In another embodiment, software running on the client devices 110 causes the predictors to be prompted to provide predictions and the polling module 320 passively receives the submitted predictions.

Regardless of how the predictions are obtained for an asset, the polling module 320 aggregates the predictions to generate a distribution of expected prices for the asset in the corresponding time period. The data generated by the polling module 320 may be added to the data corpus 160 or stored locally. In either case, this data may be used by some or all of the widgets in providing visualizations.

The widget creation module 330 provides a user interface via which users may submit or create widgets. In one embodiment, all users of the system may create widgets. Alternatively, widget creation may be limited to a set of authorized users. A widget has a title which may be selected by the creator, assigned by another user (e.g., an administrator), or assigned automatically and includes a layout of one or more elements. Widgets may also have additional associated metadata as described above. At least some of the elements of a widget provide a visualization or other analysis of data from the data corpus 160 (e.g., a "data visualization"). In some example embodiments, widgets may be used to visualize data generated from APIs. When the widget is viewed, it may access real-time data (e.g., prices of one or more specified assets) and provide a visualization of the retrieved data according to one or more rules. Widgets can include a wide range of charts and tables. The widget may also include hard coded information, such as information to aid in the interpretation of the visualized data. When a user creates a new widget, it may be added to the widget datastore 350.

Additional information about the widget is generated using a LLM to provide enhanced searching capabilities. In brief, the LLM is used to extract information about the content and context of a particular data visualization based on data in the data corpus 160 associated with that widget (e.g., the widget's title, metadata, outputs, inputs, etc.). For instance, an LLM may determine that a widget titled "Filterable Graph of Metric Over Time," may be a data visualization that is two axes, includes various data filters, displays the metric as a function of time, etc. In some circumstances, the LLM may use additional data within the ecosystems to provide additional content in context for the widget (e.g., the input and output data, the users using the visualizations, natural language requests that lead to selecting the widget, etc.).

Figure 4:
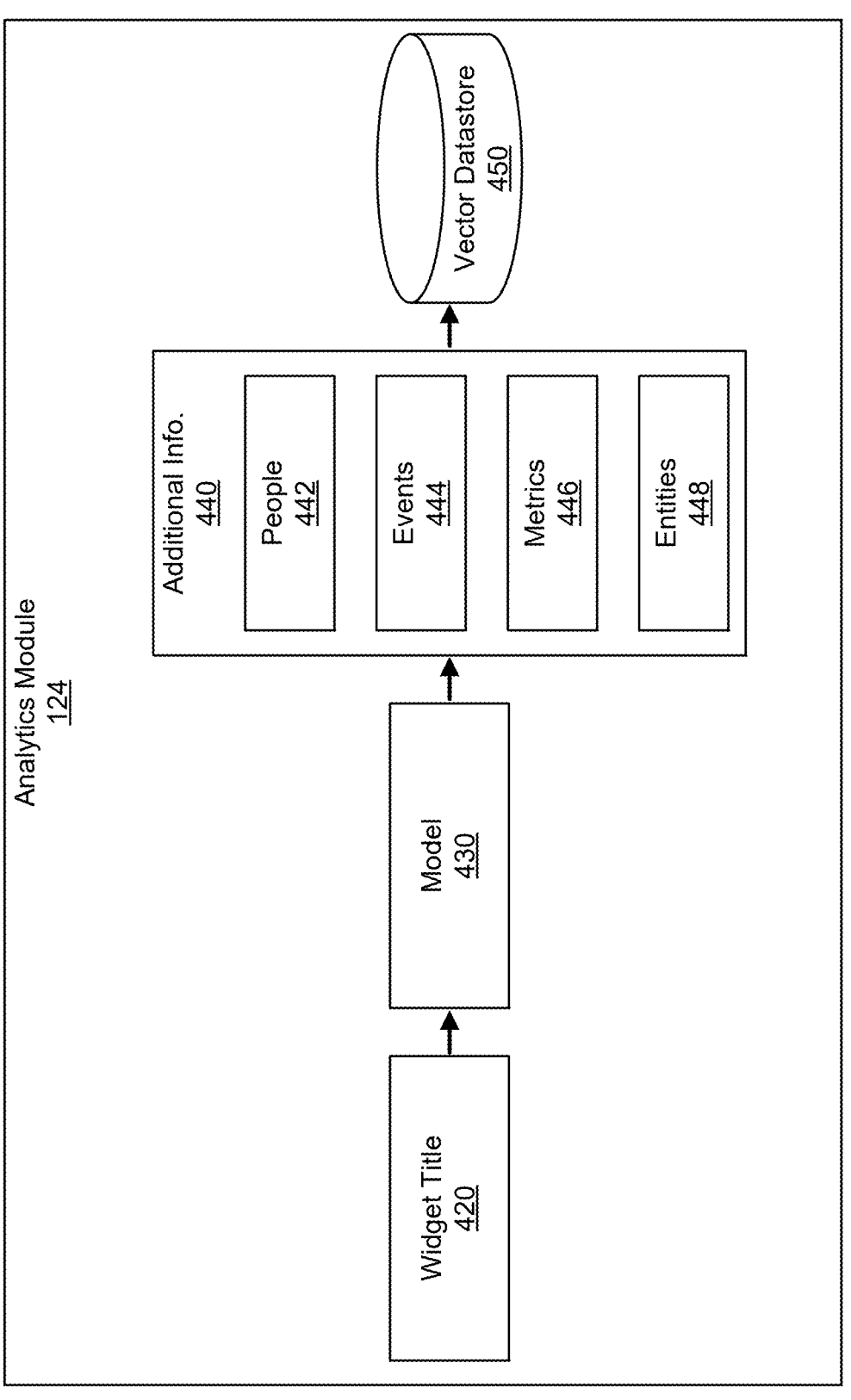
FIG. 4 illustrates an example of an analytics module providing enhanced searching capabilities, according to an example embodiment.

FIG. 4 illustrates an example of an analytics module providing enhanced searching capabilities, according to an example embodiment. In one embodiment shown in FIG. 4, the analytics module 124 provides the widget title 420 (and any other additional relevant metadata such as, e.g., metadata) to a model 430. The model 430 (e.g., a large language model), outputs additional information 440 about the widget based on the title. The model 440 may determine the additional information 340 based on, e.g., the content, context, and intent of the widget title 420 (and its associated relevant information such as, e.g., metadata). As an example, the model 430 may determine related or relevant people 442, events 444, metrics 446, entities 448, etc. Additional examples are possible.

The additional information 440 may be stored in a vector datastore 450. Vectors in the vector datastore 450 are associated with its corresponding widget. For example, each widget may be associated with the title of that widget and a vector representing the additional information 440 based on that title and/or corresponding relevant information. In this manner, each widget has a corresponding enhanced vector stored in the environment that provides a more contextual, intentional, and content-relevant representation of the widget in the environment 100 (as opposed to just the title and/or metadata).

Figure 5:
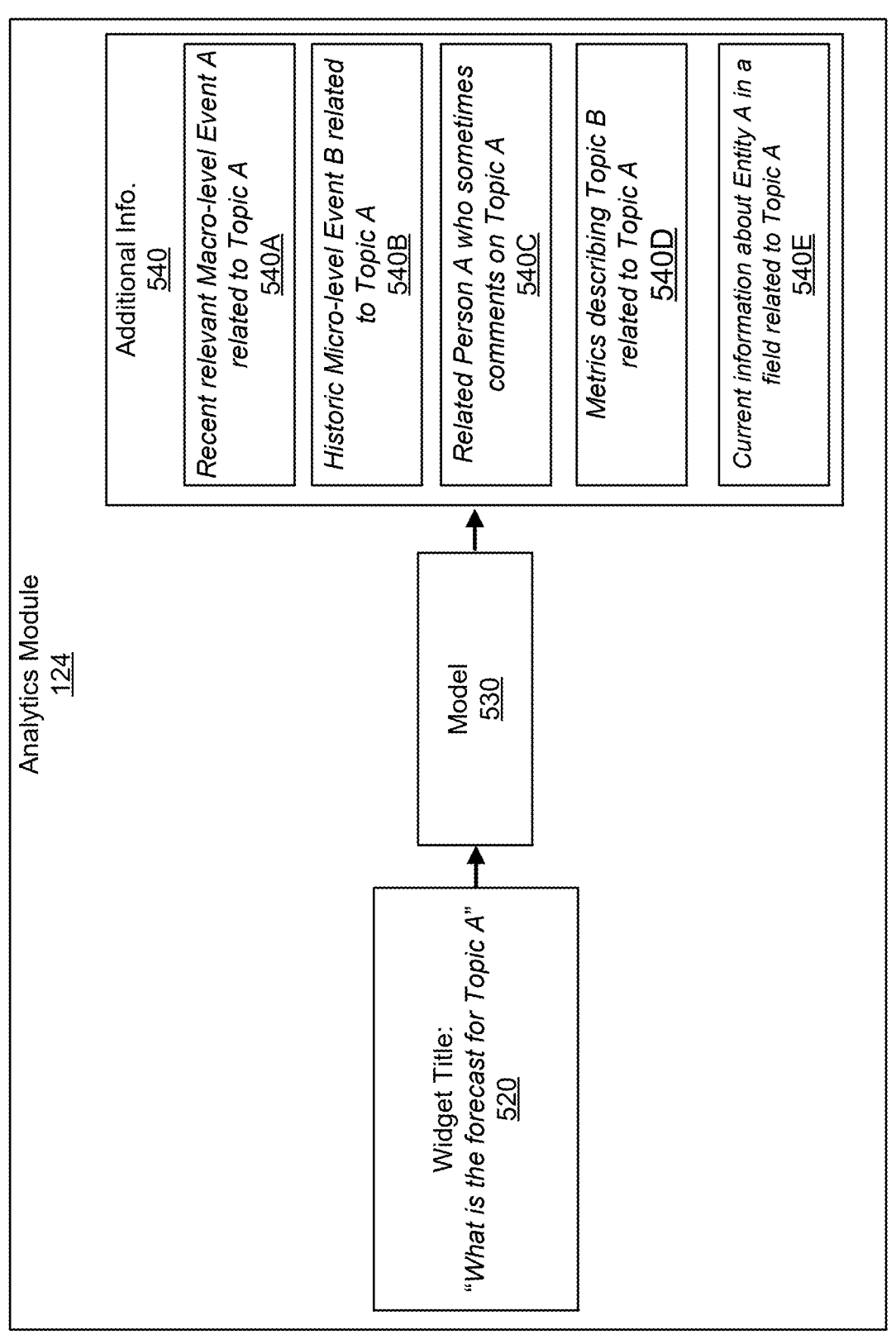
FIG. 5 illustrates an example of extracting additional information about a widget based on the widget title, according to an example embodiment.

FIG. 5 illustrates an example of extracting additional information about a widget based on the widget title, according to an example embodiment. Specifically, FIG. 5 shows a widget with the widget title 520 "What is the forecast for Topic A?" The analytics module 124 provides the widget title 520 to the model 530 (e.g., an LLM). In this example, only the title is used as an input to the model 530, but additional relevant information (e.g., metadata) may also be an input. The model 530 extracts five items of additional information 340 (e.g., 540A, 540B, 540C, 540D, and 540E). In this example, the additional information includes (1) Recent relevant Macro-level Event A related to Topic A; (2) Historic Micro-level Event B related to Topic A; (3) Related Person A who sometimes comments on Topic A; (4) Metrics describing Topic A in relation to Topic B; and (5) Current information about Entity A in a field related to Topic A. It should be apparent that some of this additional information would not be easily identified from a traditional embedding-based approach (e.g., an embedder is unlikely to easily link a title about a forecast for Topic A to metrics describing Topic B related to Topic A).

The additional information 540 for a widget may be generated by the model 530 when the widget is created, periodically (e.g., once a week or once a month, etc.), on demand, or using a combination of these approaches. Periodically regenerating the additional information may result in improved information about the widgets that reflect updates to the LLM (e.g., after the LLM is retrained using user feedback).

Referring back to FIG. 3, the widget discovery module 340 provides a user interface via which users may search for widgets. In one embodiment, the user provides a natural language query (e.g., via a client device 110) that is passed to the analytics module 124. The widget discovery module 340 queries the widget datastore 350 based on the natural language query and returns one or more recommended widgets. The recommended widgets are identified by comparing an embedding generated from the natural language query to the additional information generated from the widget titles. The embedding may also be compared to the widget titles themselves.

To expand, the natural language query may be provided to the widget discovery module 640 which applies a model that generates a vector representing the natural language query. In an example configuration, the model is a small language model such as an embedder or other similar model configured for performing searches based on embeddings (but other small language models are possible). The small language model uses trained embeddings to identify a set of candidate widget 142 in a widget catalog 142 based on language in the payload request (e.g., the natural language query).

The trained embeddings map high-dimensional vectors representing semantic and syntactic properties of a payload request (e.g., generates a vector representing the natural language request) to the information describing the widgets (e.g., to vectors representing the widget 142 including, e.g., its title, metadata, additional information, etc.). As described above, the additional information may be a vector generated by an LLM representing the semantic, syntactic, and intentional content of a widget. In other words, the small language model identifies widgets having metadata semantically or syntactically similar to language in the payload request. For instance, an embedding may associate the word "Currency Conversions" in a payload request to all widgets dealing with conversion rates between a first currency and a second currency (as indicated by their associated information). The currencies may be specified and the widgets may localize based on that specification.

These embeddings are generated through the training process where the small language model learns to associate linguistic patterns and relationships in a payload request to widgets in a catalog within a training dataset. When given an input prompt, the model looks up the embeddings for each token or word in the payload request. The model computes a contextualized representation considering the surrounding context and maps that contextualized representation to various widgets based on the trained embedding. By leveraging the learned relationships between words within the embedding space, the model can then assess the likelihood that words in a payload request relate to the functionality of various widgets. Subsequently, the model generates widgets for the payload request by selecting the most suitable widgets candidates based on the embedding-derived probabilities.

Thus, the widget discover module 340 can compare the vector representing the natural language request to the enhanced vectors representing the data visualizations. The widget discover module 340 generates a similarity score (e.g., cosine similarity) quantifying the similarity between the natural language request and the widget title based on their corresponding vectors. The widget discover module 340 may then use the similarity scores for each data visualization to select widgets for providing to the client device. Different criteria are possible. For example, the widget discover module 340 may select the ten highest-ranked widgets, or all widgets for which the similarity score exceeds a threshold, etc. In some instances, the widget discover module 340 may rank the widgets based on their score.

Figure 6:
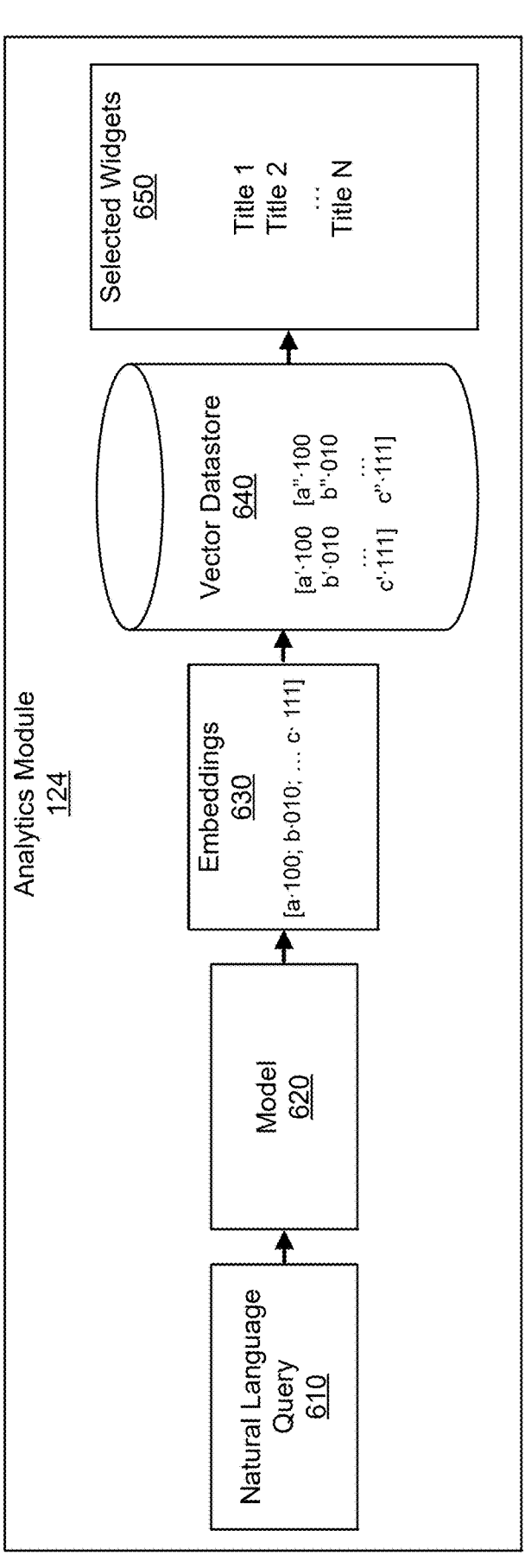
FIG. 6 illustrates one embodiment of a process for enhanced discovery of widgets, according to an example embodiment.

FIG. 6 illustrates one embodiment of a process for enhanced discovery of widgets, according to an example embodiment. In the illustrated example, a natural language query 610 (e.g., a widget search query) is passed to a model 620 (e.g., a small language model such as an embedder). The model 620 generates an embedding 630 representing the content, syntax, and content of the natural language query 610 in higher dimensional space. The embedding 630 is compared to enhanced vectors representing the widgets. The enhanced vectors may be the information about widgets stored in the enhanced vector store 640 (e.g., vectors representing the additional information 440 about widgets generated from the output of a model). The analytics module 124 calculates a score representing a similarity between the embedding and the enhanced vector and uses the comparison (e.g., score) to select widgets (e.g., K selected widgets 650) with the highest degree of similarity. The selected widgets are then returned as a result to the natural language query.

Figure 7:
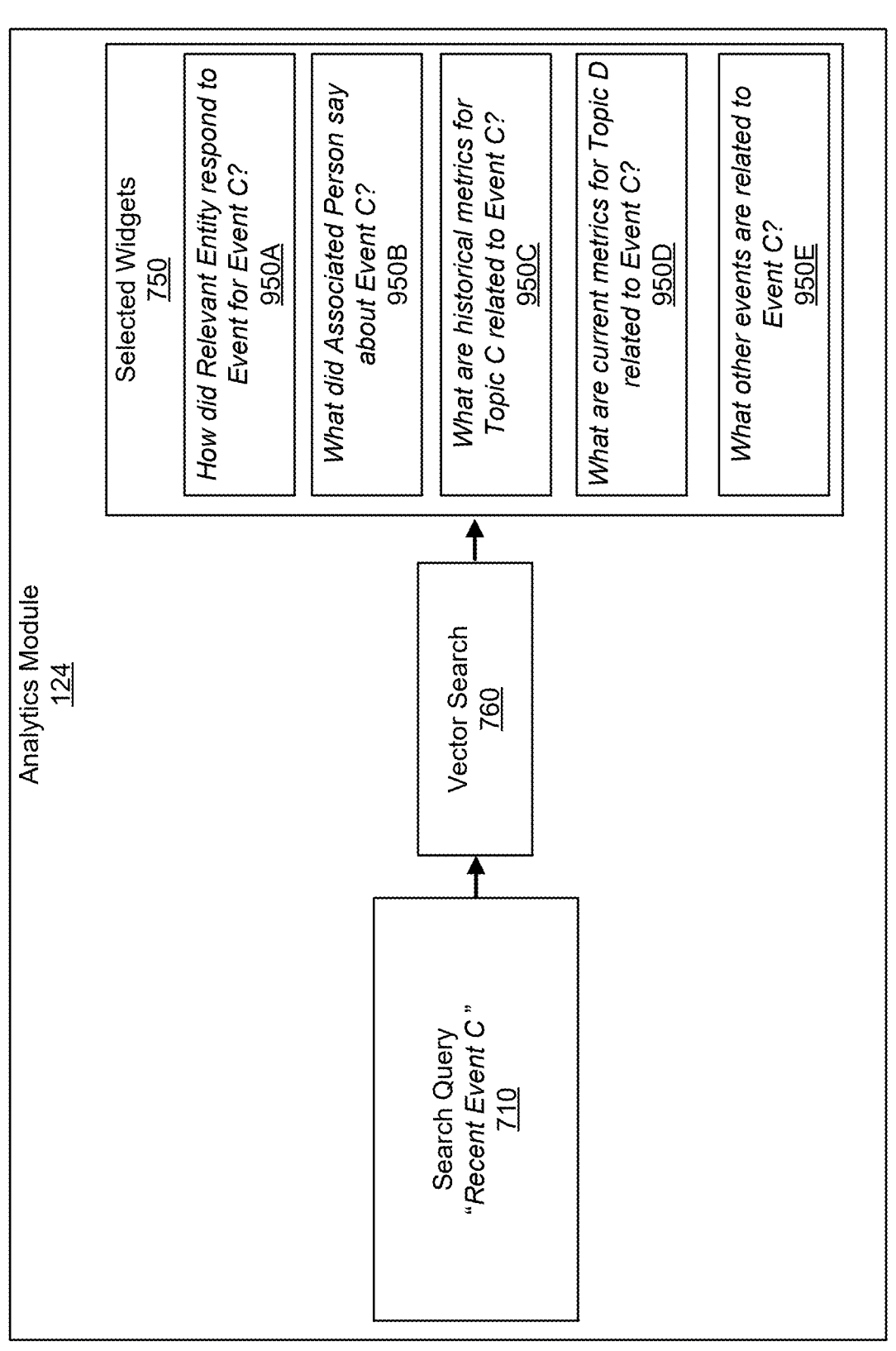
FIG. 7 illustrates a specific example of enhanced discovery of widgets, according to an example embodiment.

FIG. 7 illustrates a specific example of enhanced discovery of widgets, according to an example embodiment. In this example, a user submits a natural language search query 610 "Recent Event C" to the analytics module 124. The analytics module 124 performs the vector search 760 (e.g., applying a model to generate embeddings representing the query, and comparing the embeddings to the enhanced vectors). The vector search 760 returns five selected widgets 760 (e.g., 750A, 750B, 750C, 750D, and 750D), including (1) How did Relevant Entity respond to Event for Event C?; (2) What did Associated Person say about Event C?; (3) What are historical metrics for Topic C related to Event C?; (4) What are current metrics for Topic D?; and (5) What other events are related to Event C? As with the generation of additional information, it should be appreciated that some or all of these results are unlikely to be generated using a conventional embedding-centric approach. For example, metrics for Topic D, which may only be loosely associated with Event C, is unlikely to be identified by an embedder as relevant to Event C.

The analytics module 124 may provide the search results (e.g., the selected widgets) to a requesting client device 110 in a number of ways. For instance, the analytics module 124 may provide the appropriate executables to execute each of the widgets locally on the client device 110, provide an option for the user of the client device 110 to select a widget to execute on the network system 120, or provide the location of the widget in the environment 100 such that the client device 110 can access and execute the widget. Once a user receives search results, the user may select one or more of the widgets to view them within this context. In some embodiments, the user may add selected widgets to a dashboard or favorites list to enable quick recall of these widgets at a later time.

Referring once again to FIG. 3, the widget datastore 350 includes one or more computer-readable media that store the code for providing widgets to users. The widget datastore 350 may also include data used the analytics module 124, such as user profile data indicating the preferences (e.g., default parameters) of users and cached copies of some or all of the data used to drive widgets. Although the widget datastore 350 is shown as a single entity within the analytics module 124, this functionality may be provided by multiple datastores, some or all of which may be physically separated from the analytics module 124 and accessed via the network 170. In some examples, the widget datastore 350 may be the widget catalog 140.

Figure 8:
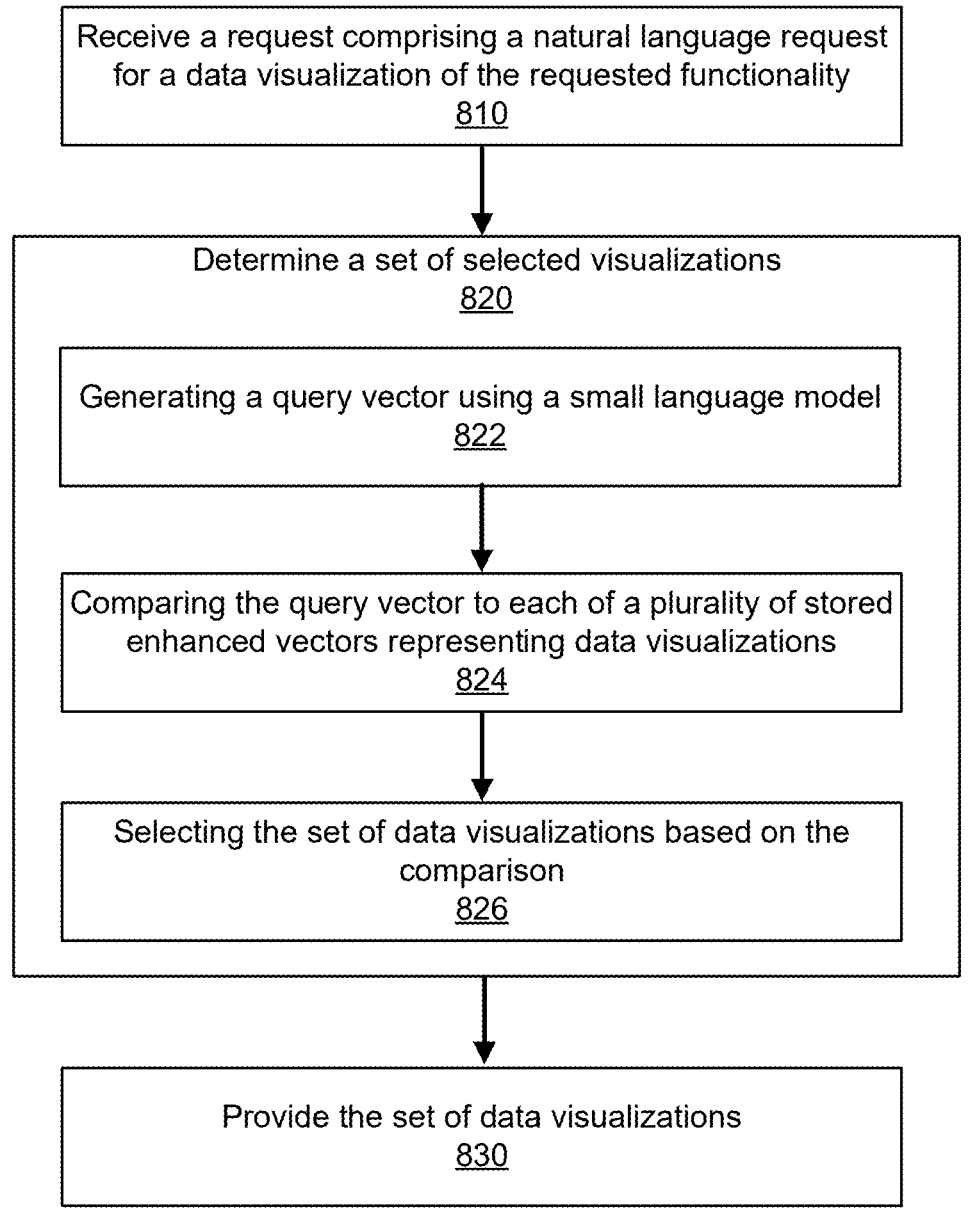
FIG. 8 illustrates a workflow diagram for processing a natural language query, according to an example embodiment.

FIG. 8 illustrates a workflow diagram for processing a natural language query, according to an example embodiment. The method described by the workflow 800 may include additional or fewer steps, and/or the steps may occur in a different order. Moreover, one or more of the steps may be repeated or omitted.

In the workflow, a user is operating a client device 110 to generate payload requests for the network system 120, and the network system 120 provides payload response in response to those requests. In this example, the payload request is considered a natural language request for a widget that provides a data visualization for information in the environment (e.g., a data visualization). The information may be a particular requested functionality that may be performed in the environment.

Within the system environment is a widget catalog 140. The widget catalog 140 includes widgets 142, one or more of which provide a visualization for the requested functionality. The network system 120 employs the analytics module 124 to store the widgets in the widget catalog 140. Widgets stored in the widget catalog may be associated with an advanced vector representing information associated with that widget as described above.

The user generates the payload request using, e.g., an application 210 on the client device 110. The payload request includes a request for a data visualization (e.g., widget 142) of information within the system environment

100 (e.g., available in the data corpus 160). The request is a natural language request for the desired visualization. The user transmits the payload request to the network system 120, and the network system 120 receives 810 the payload request.

The network system 120, using the analytics module 124, determines 820 a set of selected visualizations based on the natural language request in the payload request. To do so, the network system 120 generates 822 a query vector using a small language model. The query vector is a representation of the natural language search query in higher dimensional space and reflects, e.g., the syntax and content of the natural language request.

The network system 120 compares 824 the query vector to each of the enhanced vectors representing the various widgets (e.g., data visualizations) in the environment. In doing so, the network system calculates a similarity score quantifying a degree of similarity between the query vector and each of the enhanced vectors. The network system 120 selects 826 widgets having a similarity score above a threshold similarity score as a set of selected data visualizations. The set of selected data visualizations have a high probability of providing the appropriate visualization based on the comparison of the two vectors.

The network system 120 provides 830 the selected data visualizations to the client device as the payload response. The client device may select one or more of the data visualizations for execution and display on the client device.

III. Additional Configuration Examples

In some example configurations, the system environment 100 may have one or more catalogs 140. The system environment 100 may include a first catalog with a first set of widgets, a second catalog with a second set of widgets, etc. In generating the one or more catalogs 140, 140 the network system 120 may group widgets into catalogs based on any number of parameters or characteristics (e.g., size, enterprise system 150 from which it was obtained, metadata, etc.). Additionally, a user of a client device 110 may define how catalogs are generated.

In some example configurations, a user of a client device 110 may define which widget catalog 140 (or catalogs) in the system environment 100 to choose candidate widgets from. Similarly, in some configurations, the network system 120 may determine which catalogs are most appropriate for selecting candidate widgets based on the language of the payload request. For instance, the network system 120 may determine that a first catalog or set of catalogs would include widgets associated with a payload request, while determining a second catalog or set of catalogs does not include widgets associated with the payload request.

In some example configurations, a user of a client device 110 may provide a payload request that results in one or more payload responses. For instance, the user may provide a payload request that requests two pieces of information, and the analytics module 124 may provide payload responses, each of which provides an individual response for the payload request. Similarly, a user of a client device 110 may provide a payload request that results in the selection of one or more widgets generate a payload response for that single request. For instance, a single payload request may select two or more widgets that, in conjunction, provide the requested functionality in the payload request.

In some example configurations, a payload request may include a request for desired functionality, such that the payload response includes a widget to provide the visualization for the desired functionality. Thus, the network system 120 may apply a combination of models to a natural language request that interprets the natural language as requesting a desired functionality and provides both the method of achieving and visualizing that functionality (e.g., a widget). In some cases, this may be done without additional input from the user, or the user may be offered an opportunity to select from a set of widgets as described hereinabove.

IV. Computer System

Figure 9:
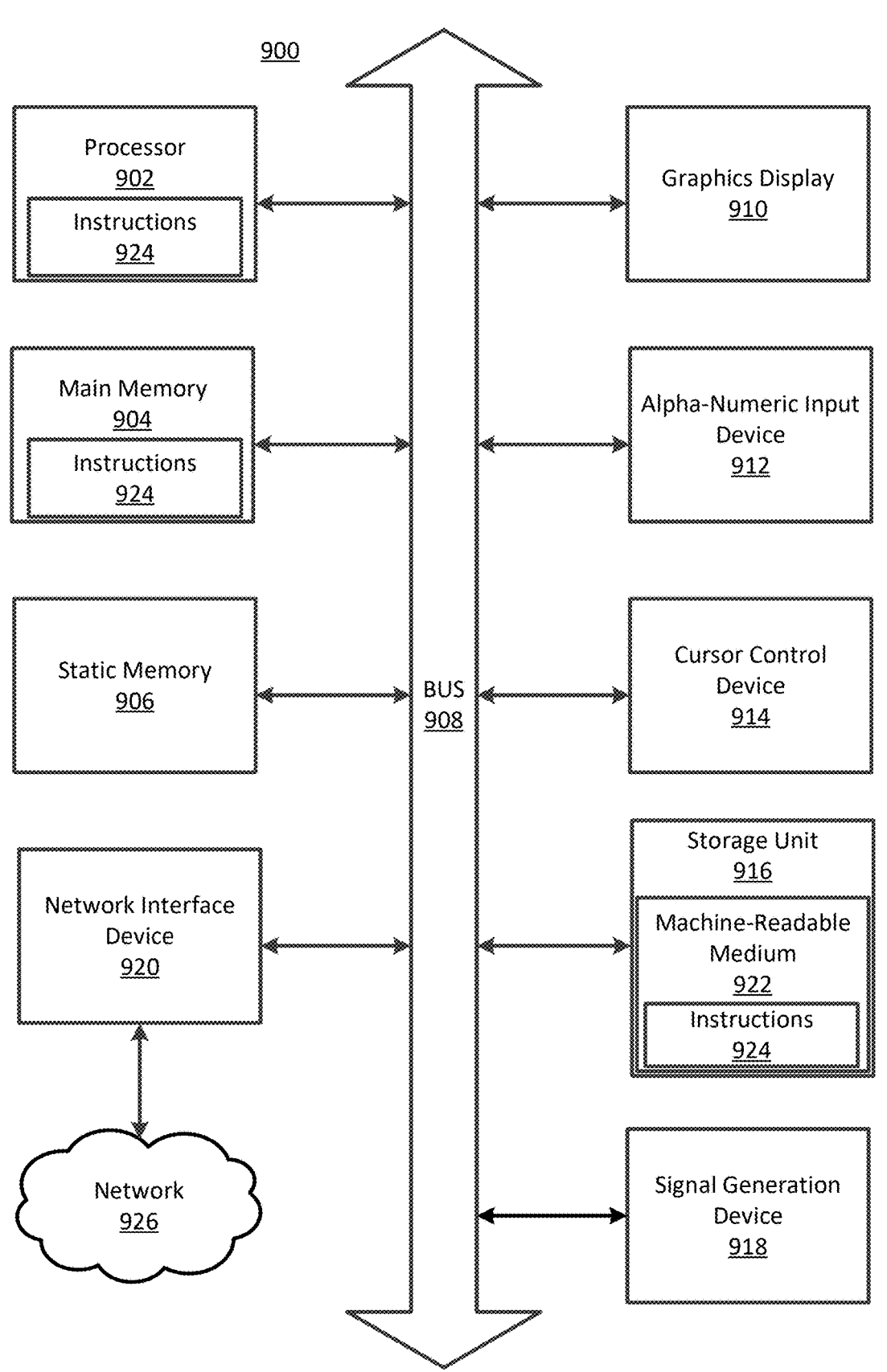
FIG. 9 is a block diagram illustrating components of an example machine for reading and executing instructions from a machine-readable medium, according to an example embodiment.

FIG. 9 is a block diagram illustrating components of an example machine for reading and executing instructions from a machine-readable medium, according to an example embodiment. Specifically, FIGS. 1 and 2 show a diagrammatic representation of computer systems employed throughout the Specification. These systems can be in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the systems described in FIG. 1. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 (e.g., network 170) via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A method for generating a payload response for a requested functionality and a data visualization for the requested functionality in a system environment, the method comprising:

receiving, at a network system from a client device, a request comprising a natural language request for the data visualization of the requested functionality;

selecting one or more datastores from a plurality of datastores based on an analysis of the natural language request to determine a data domain associated with the requested functionality, wherein each datastore is associated with a different data domain and each of the data stores comprises a data corpus including structured data describing at least one of transactions, metrics, or time-series data for the corresponding data domain;

determining, at the network system, a set of selected data visualizations from the selected one or more datastores, each of the selected data visualizations configured for displaying information about the requested functionality, the determination comprising:

generating a query vector representing the natural language request using a small language model;

comparing the query vector to each of a plurality of stored enhanced vectors from the selected one or more datastores, each stored enhanced vector corresponding to a data visualization of a plurality of data visualizations, and the plurality of stored enhanced vectors generated by applying a large language model to at least a title for each of the plurality of data visualizations to extract semantic content, context, and intent of the title; and selecting one or more of the plurality of data visualizations as the set of selected data visualizations based on the comparison; and providing, from the network system to the client device, the set of selected data visualizations to the client device for visualizing data from the data corpus.

2. The method of claim 1, wherein selecting the set of selected data visualization based on the comparison comprises calculating a similarity between the query vector and each of the plurality of stored enhanced vectors corresponding to data visualizations.

3. The method of claim 2, wherein the set of selected data visualizations comprises a number of data visualizations having a calculated similarity above a threshold.

4. The method of claim 2, wherein the set of selected data visualizations comprises a predetermined number of data visualizations.

5. The method of claim 1, further comprising:

applying a model to each of the plurality of data visualizations to determine additional information describing the plurality of data visualizations; and generating a stored enhanced vector representing the additional information for each of the plurality of data visualizations.

6. The method of claim 5, wherein the model is a large language model and the additional information is information associated with content, context, and intent of a title of the data visualization.

7. The method of claim 5, wherein the additional information comprises one or more of people, events, metrics, or entities associated with a title of the data visualization.

8. The method of claim 1, further comprising:

requesting, from one or more additional client devices, data for generating a data corpus, the data corpus comprising information which the plurality of data visualizations are configured to visualize.

9. The method of claim 1, further comprising:

receiving, from one or more additional client devices, one or more data visualizations for the plurality of data visualizations.

10. The method of claim 1, further comprising:

selecting one or more datastores from a plurality of datastores, the selection based on a comparison of visualizations stored in each of the plurality of datastores to the requested functionality of the natural language request; and selecting the plurality of data visualizations from the selected one or more datastores.

11. A non-transitory computer-readable storage medium comprising computer program instructions for generating a payload response for a requested functionality and a data visualization for the requested functionality in a system environment, the computer program instructions, when executed by one or more processors, causing the one or more processors to:

receive, at a network system from a client device, a request comprising a natural language request for the data visualization of the requested functionality;

select one or more datastores from a plurality of datastores based on an analysis of the natural language request to determine a data domain associated with the requested functionality, wherein each datastore is associated with a different data domain and each of the data stores comprises a data corpus including structured data describing at least one of transactions, metrics, or time-series data for the corresponding data domain;

determine, at the network system, a set of selected data visualizations from the selected one or more datastores, each of the selected data visualizations configured for displaying information about the requested functionality, the determination comprising:

generating a query vector representing the natural language request using a small language model;

comparing the query vector to each of a plurality of stored enhanced vectors from the selected one or more datastores, each stored enhanced vector corresponding to a data visualization of a plurality of data visualizations, and the plurality of stored enhanced vectors generated by applying a large language model to at least a title for each of the plurality of data visualizations to extract semantic content, context, and intent of the title; and selecting one or more of the plurality of data visualizations as the set of selected data visualizations based on the comparison; and provide, from the network system to the client device, the set of selected data visualizations to the client device for visualizing data from the data corpus.

12. The non-transitory computer-readable storage medium of claim 11, wherein selecting the set of selected data visualization based on the comparison causes the one or more processors to:

calculate a similarity between the query vector and each of the plurality of stored enhanced vectors corresponding to data visualizations.

13. The non-transitory computer-readable storage medium of claim 12, wherein the set of selected data visualizations comprises a number of data visualizations having a calculated similarity above a threshold.

14. The non-transitory computer-readable storage medium of claim 12, wherein the set of selected data visualizations comprises a predetermined number of data visualizations.

15. The non-transitory computer-readable storage medium of claim 11, wherein the computer program instructions, when executed by the one or more processors, cause the one or more processors to:

apply a model to each of the plurality of data visualizations to determine additional information describing the plurality of data visualizations; and generate a stored enhanced vector representing the additional information for each of the plurality of data visualizations.

16. The non-transitory computer-readable storage medium of claim 15, wherein the model is a large language model and the additional information is information associated with content, context, and intent of a title of the data visualization.

17. The non-transitory computer-readable storage medium of claim 15, wherein the additional information comprises one or more of people, events, metrics, or entities associated with a title of the data visualization.

18. The non-transitory computer-readable storage medium of claim 11, wherein the computer program instructions, when executed by the one or more processors, cause the one or more processors to:

request, from one or more additional client devices, data for generating a data corpus, the data corpus comprising information which the plurality of data visualizations are configured to visualize.

19. The non-transitory computer-readable storage medium of claim 11, wherein the computer program instructions, when executed by the one or more processors, cause the one or more processors to:

receive, from one or more additional client devices, one or more data visualizations for the plurality of data visualizations.

20. The non-transitory computer-readable storage medium of claim 11, wherein the computer program instructions, when executed by the one or more processors, cause the one or more processors to:

select one or more datastores from a plurality of datastores, the selection based on a comparison of visualizations stored in each of the plurality of datastores to the functionality requested in the natural language request; and select the set of visualization from the selected one or
more datastores.

\*  \*  \*  \*  \*